United States Patent
Gurdiel Gonzalez et al.

(10) Patent No.: US 11,731,364 B2
(45) Date of Patent: Aug. 22, 2023

(54) PREDICTED OBJECT ATTRIBUTES

(71) Applicant: HEWLETT-PACKARD DEVELOPMENT COMPANY, L.P., Spring, TX (US)

(72) Inventors: Enrique Gurdiel Gonzalez, Sant Cugat del Valles (ES); Victor Diego Gutierrez, Sant Cugat del Valles (ES); Manuel Freire Garcia, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 131 days.

(21) Appl. No.: 17/270,379

(22) PCT Filed: Jan. 31, 2019

(86) PCT No.: PCT/US2019/016016
§ 371 (c)(1),
(2) Date: Feb. 22, 2021

(87) PCT Pub. No.: WO2020/159509
PCT Pub. Date: Aug. 6, 2020

(65) Prior Publication Data
US 2021/0181714 A1    Jun. 17, 2021

(51) Int. Cl.
*B29C 64/386*  (2017.01)
*B33Y 50/00*  (2015.01)
(Continued)

(52) U.S. Cl.
CPC .......... *B29C 64/386* (2017.08); *B22F 10/28* (2021.01); *B22F 10/80* (2021.01); *B22F 12/82* (2021.01);
(Continued)

(58) Field of Classification Search
CPC ...... G05B 19/4099; G05B 2219/35134; G05B 2219/49023; B22F 10/80; B22F 10/14;
(Continued)

(56) References Cited

U.S. PATENT DOCUMENTS

| 10,073,424 B2 | 9/2018 | Lin et al. |
| 2005/0038549 A1* | 2/2005 | Loughran .......... G05B 19/4083 |
| | | 700/119 |

(Continued)

FOREIGN PATENT DOCUMENTS

| CN | 105313336 B | 7/2017 | |
| JP | 2015184315 A * | 10/2015 | .......... G03F 7/70508 |
| WO | WO-2018151212 A1 * | 8/2018 | ............... B22C 9/06 |

*Primary Examiner* — Thomas C Lee
*Assistant Examiner* — Michael Tang
(74) *Attorney, Agent, or Firm* — Michael Dryja

(57) ABSTRACT

In an example, a method includes receiving object model data representing at least a portion of an object that is to be generated by an additive manufacturing apparatus by fusing build material within a fabrication chamber. At least one of a number of different geometrical compensation models to be applied to the object model data may be selected, where the geometrical compensation models are to determine geometrical compensations to compensate for object deformation in additive manufacturing. An object generation operation based on a modification of the object model data using the or each selected geometrical compensation mode may be simulated and predicted attributes of the object when generated based on the or each simulation may be displayed.

13 Claims, 4 Drawing Sheets

(51) Int. Cl.
*B22F 10/80* (2021.01)
*G05B 19/4099* (2006.01)
*B22F 10/28* (2021.01)
*B22F 12/82* (2021.01)
B29C 64/165 (2017.01)
B22F 10/14 (2021.01)

(52) U.S. Cl.
CPC .......... *B33Y 50/00* (2014.12); *G05B 19/4099* (2013.01); *B22F 10/14* (2021.01); *B29C 64/165* (2017.08); *G05B 2219/35134* (2013.01); *G05B 2219/49023* (2013.01)

(58) Field of Classification Search
CPC ........ B22F 10/28; B22F 12/82; B29C 64/386; B29C 64/165; B33Y 50/00; B33Y 30/00; B33Y 50/02; G06F 30/20; G06F 2113/10; Y02P 80/40; Y02P 10/25
See application file for complete search history.

(56) References Cited

U.S. PATENT DOCUMENTS

| | | | |
|---|---|---|---|
| 2011/0305453 A1* | 12/2011 | Hauske | H04B 10/6971 398/25 |
| 2012/0165898 A1* | 6/2012 | Moffitt | A61N 1/36128 607/45 |
| 2016/0082666 A1* | 3/2016 | de Pena | B29C 64/393 700/98 |
| 2016/0246908 A1 | 8/2016 | Komzsik | |
| 2016/0274830 A1 | 9/2016 | Jang et al. | |
| 2016/0320771 A1* | 11/2016 | Huang | B33Y 50/00 |
| 2017/0203515 A1 | 7/2017 | Bennett et al. | |
| 2017/0372480 A1* | 12/2017 | Anand | G06T 7/11 |
| 2018/0311757 A1 | 11/2018 | Bucknell et al. | |
| 2019/0004079 A1* | 1/2019 | Blom | B22F 10/20 |
| 2019/0054700 A1* | 2/2019 | Chandar | G06F 17/18 |
| 2019/0377843 A1* | 12/2019 | Chen | G06T 17/20 |
| 2020/0074028 A1* | 3/2020 | Yang | B29C 64/386 |
| 2021/0299753 A1* | 9/2021 | Hartmann | B22F 10/66 |

* cited by examiner

PREDICTED OBJECT ATTRIBUTES

BACKGROUND

Additive manufacturing techniques may generate a three-dimensional object through the solidification of a build material, for example on a layer-by-layer basis. In examples of such techniques, build material may be supplied in a layer-wise manner and the solidification method may include heating the layers of build material to cause melting in selected regions. In other techniques, chemical solidification methods may be used.

BRIEF DESCRIPTION OF DRAWINGS

Non-limiting examples will now be described with reference to the accompanying drawings, in which.

DETAILED DESCRIPTION

Figure 1:
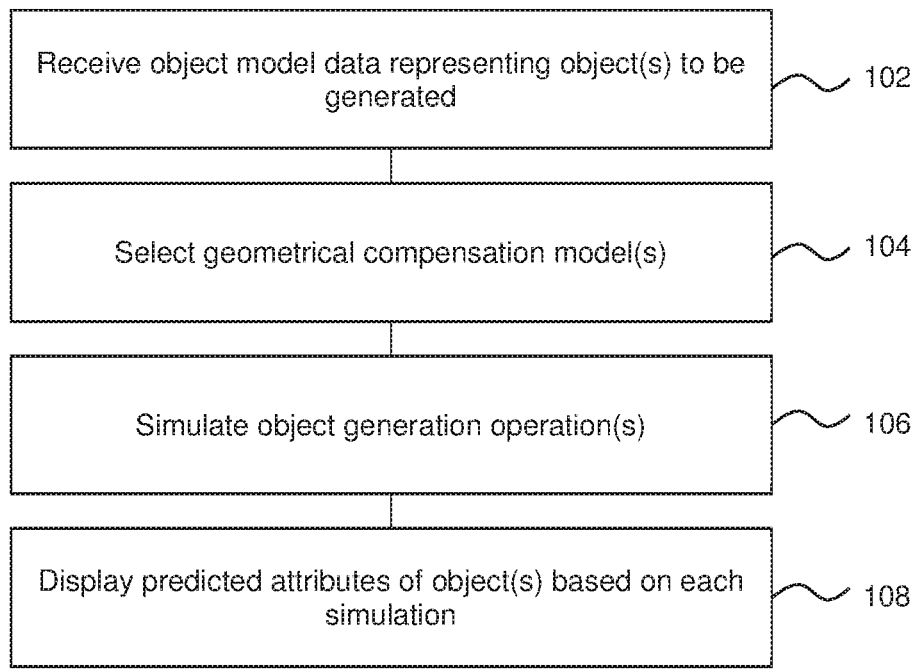
FIG. 1 is a flowchart of an example method of predicting object attributes.

Additive manufacturing techniques may generate a three-dimensional object through the solidification of a build material. In some examples, the build material is a powder-like granular material, which may for example be a plastic, ceramic or metal powder and the properties of generated objects may depend on the type of build material and the type of solidification mechanism used. In some examples the powder may be formed from, or may include, short fibres that may, for example, have been cut into short lengths from long strands or threads of material. Build material may be deposited, for example on a print bed and processed layer by layer, for example within a fabrication chamber. According to one example, a suitable build material may be PA12 build material commercially referred to as V1R10A "HP PA12" available from HP Inc.

In some examples, selective solidification is achieved using heat, for example through directional application of energy, for example using a laser or electron beam which results in solidification of build material where the directional energy is applied. In other examples, at least one print agent may be selectively applied to the build material, and may be liquid when applied. For example, a fusing agent (also termed a 'coalescence agent' or 'coalescing agent') may be selectively distributed onto portions of a layer of build material in a pattern derived from data representing a slice of a three-dimensional object to be generated (which may for example be generated from structural design data). The fusing agent may have a composition which absorbs energy such that, when energy (for example, heat) is applied to the layer, the build material heats up, coalesces and solidifies upon cooling, to form a slice of the three-dimensional object in accordance with the pattern. In other examples, coalescence may be achieved in some other manner.

According to one example, a suitable fusing agent may be an ink-type formulation comprising carbon black, such as, for example, the fusing agent formulation commercially referred to as V1Q60A "HP fusing agent" available from HP Inc. In examples, such a fusing agent may comprise any or any combination of an infra-red light absorber, a near infra-red light absorber, a visible light absorber and a UV light absorber. Examples of print agents comprising visible light enhancers are dye based colored ink and pigment based colored ink, such as inks commercially referred to as CE039A and CE042A available from HP Inc.

In addition to a fusing agent, in some examples, a print agent may comprise a coalescence modifier agent, which acts to modify the effects of a fusing agent for example by reducing or increasing coalescence or to assist in producing a particular finish or appearance to an object, and such agents may therefore be termed detailing agents. In some examples, detailing agent may be used near edge surfaces of an object being printed. According to one example, a suitable detailing agent may be a formulation commercially referred to as V1Q61A "HP detailing agent" available from HP Inc. A coloring agent, for example comprising a dye or colorant, may in some examples be used as a fusing agent or a coalescence modifier agent, and/or as a print agent to provide a particular color for the object.

As noted above, additive manufacturing systems may generate objects based on structural design data. This may involve a designer generating a three-dimensional model of an object to be generated, for example using a computer aided design (CAD) application. The model may define the solid portions of the object. To generate a three-dimensional object from the model using an additive manufacturing system, the model data can be processed to generate slices of parallel planes of the model. Each slice may define a portion of a respective layer of build material that is to be solidified or caused to coalesce by the additive manufacturing system.

FIG. 1 is an example of a method, which may comprise a computer implemented method of generating (at least partial) simulation(s) of object generation operations in order to predict object attributes.

The simulated object generation operations may be based on different modifications of object model data. For example, such modifications of object model data may be used to apply a geometrical compensation in order to compensate for anticipated departures from intended dimensions when generating an object.

For example, it may be the case that when an object is generated in a process which includes heat, additional build material may adhere to the object on generation. In one example, fusing agent may be associated with a region of the layer which is intended to fuse. However, when energy is supplied, build material of neighbouring regions may become heated and fuse to the outside of the object (in some examples, being fully or partially melted, or adhering to melted build material as powder). Therefore, a dimension of an object(s) may be larger than the regions to which fusing agent is applied. In order to compensate for this effect, i.e. where it is anticipated that an object may tend to 'grow' during manufacture in this manner, the object volume as described in object model data may be reduced to compensate for such growth. The reduction of the volume may be defined in a geometrical compensation/transformation model.

In other examples, objects may be smaller following object generation than is specified. For example, some build materials used to generate objects may shrink on cooling. Therefore, a geometrical compensation/transformation model may specify how an object volume should be increased to compensate for the reduction.

A particular object may be subject to mechanisms which result in growth and shrinkage, and the actual compensation to be applied may be determined by consideration of, or may be influenced by, the different degrees by which an object may be affected by such processes.

In some examples, a modification may be specified using scaling and/or offset parameters (for example, a scaling factor and/or an offset factor). A scaling factor may be used to multiply all specified dimensions in the direction of a at least one axis by a value, which may be greater than 1 in order to increase the dimension(s) and less than 1 to reduce the dimension(s). An offset factor may specify, for example by a specified distance or a number of defined sub volumes or 'voxels' (i.e. three-dimensional pixels), an amount to add or remove from a surface of the object (or a perimeter within a layer). For example, a distance as measured in the direction of a normal from the object surface may be specified and the object may be eroded or dilated (i.e., inflated or enlarged) by this distance.

According to at least some of the methods set out herein, different geometrical compensation models may be used to generate different simulations. For example, in some cases it has been shown that the location of an object within a fabrication chamber may have an impact on object deformation on generation. Therefore, an appropriate compensation may be determined using the location of the object. A first geometrical compensation model may generate a simulation based on compensation factors determined based on a location of an object in a fabrication chamber, wherein the location is characterised in a first manner. Another geometrical compensation model may characterise the location in a different manner, and may use the same and/or different compensation factors.

In other examples a geometrical compensation model may generate a simulation based on compensation factors determined based on a volume of an object, as bulkier objects may deform differently to smaller objects. For example, bulkier objects tend to accumulate more heat in thermal fusion based additive manufacturing operations.

Another geometrical compensation model may consider, for example, a surface area of an object, in some examples in combination with the volume. The surface area (and combinations of the volume and surface area) may be used to determine how 'solid' an object is. The amount of solid material in an object may be used to predict how the object may deform. For example, a more solid object may tend to accumulate more heat than a less solid object in a thermal fusing additive manufacturing operation.

In some examples, combinations of such factors may be considered in a models, and/or there may be more than one model in a category, for example models which are generated independently resulting in different compensation values. Examples of models are discussed in greater detail below.

The method of FIG. 1 comprises, in block 102, receiving, at at least one processor, object model data representing at least a portion of at least one object that is to be generated by an additive manufacturing apparatus by fusing build material within a fabrication chamber. In some examples, the fusing process may comprise a thermal fusing process in which heat is applied. The object model data may comprise data representing at least a portion (in some examples, a slice) of an object to be generated by an additive manufacturing apparatus by fusing a build material. The object model data may for example comprise a Computer Aided Design (CAD) model, and/or may for example be a STereoLithographic (STL) data file. In some examples, the object model data may represent the object or object portion as a plurality of sub-volumes, wherein each sub-volume represents a region of the object which is individually addressable in object generation. In some examples herein, the sub-volumes may be referred to as voxels, i.e. three-dimensional pixels. In some examples, the object model data may represent a printable arrangement of a plurality of objects to be generated by an additive manufacturing apparatus by fusing build material within a fabrication chamber.

The method further comprises, in block 104, selecting, using at least one processor, at least one of a plurality of different geometrical compensation models to be applied to the object model data, wherein the geometrical compensation models are to determine geometrical compensations to compensate for object deformation in additive manufacturing.

For example, a geometrical compensation may comprise a parametrical transformation, for example a geometrical transformation such as at least one of an offset and a scaling factor. For example, a geometrical compensation vector may specify components in an X and Y axis (for example to be applied in a single slice of an object), or in other examples may specify components in an X, Y and Z axis.

In some examples, a geometrical compensation may be defined using two or three scaling factors (one for each of two/three axes, which may be orthogonal) and/or two or three offset factors (one for each of two/three axes, which may be orthogonal). If scaling is not indicated in a given axis, the scaling factor in relation to that axis may be set to 1, and if no offset is indicated in a given axis, the offset factor in relation to that axis may be set to 0.

Taking an example in which a scaling factor is specified in each of three orthogonal axes, this may in some examples be specified as a vector having components in the X, Y and Z directions, and may for example be specified as [$SF_x$, $SF_y$, $SF_z$]. This may, for example, taking the object in its intended generation orientation, mean that the 'width' of the object is to be scaled by $SF_x$, the 'depth' of the object is to be scaled by $SF_y$, and the 'height' of the object is to be scaled by $SF_z$ (noting that, in practice, the object may be generated in any orientation, and therefore the height of the object during generation may not correspond to the height of the object as orientated for use thereof following generation).

A geometrical compensation model may comprise one or a plurality of predefined geometrical compensations, and/or may comprise information used to derive geometrical compensation(s) to apply to an object. For example, the models may specify expected input parameter(s) (such as object location, object volume, and the like) which are to be provided to determine geometrical compensation(s) to apply to an object. For example, there may be a mapping between such input parameter(s) and geometrical compensation(s), as is set out in greater detail below.

Such geometrical compensation models may for example be determined by trial and error over time and/or using machine learning techniques. In some examples the geometrical compensation models may be generated based on an analysis of thermal and/or material considerations and the like.

One example of a geometrical compensation model may comprise one or a set of scaling and/or offset parameters associated with a particular object generation apparatus, or type of object generation apparatus. The parameters may be applied to all objects in the same way (for example, regardless of the object size and/or placement).

In other examples, a geometrical compensation model may allow a geometrical compensation derived or selected therefrom to be tailored to a particular intended object generation operation and/or object.

For example, a geometrical compensation model may take account of an intended location of an object in a fabrication chamber. It has been noted that dimensional accuracy may be significantly improved by considering the location of object generation when determining a compensation, and therefore different compensation parameters may be applied for different object locations to improve accuracy. Such geometrical compensation models may therefore comprise or provide compensation parameters which may be mapped to the intended location of the object.

For example, if an object is to be generated in a first location, the location may be mapped to a geometrical compensation comprising one or more offset and/or scaling parameter. However, if the same object were to be generated in a second location, this second location may be mapped to a different geometrical compensation comprising one or more different offset and/or scaling parameter. Thus, the particular geometrical compensation applied may vary between different locations based on predetermined mappings or the like.

In some examples, in at least one geometrical compensation model, the location may be modelled as a single representative location. In one example, this may comprise a centre point of an object to be generated in additive manufacturing when the object is in its intended location within a fabrication chamber. This may comprise generating a virtual fabrication chamber, in which one or a plurality of virtual objects are arranged in the position which it is intended that the objects would occupy on generation. In some examples, the location is a centre of mass of the object, but in another example/model, it may be some other location, for example the centre of a bounding box, i.e. the smallest cuboid which can fully enclose the object, a lowermost coordinate, or any other predetermined coordinate.

In some examples, at least one geometrical compensation model may comprise a plurality of defined geometrical compensation parameters (or parameter sets), each associated with different locations within the fabrication chamber. In such examples, a particular geometrical compensation parameter(s) may be selected based on the intended object generation location. In some examples, defined locations may be associated with geometrical compensation parameter(s), and the geometrical compensation parameter(s) to apply at locations intermediate to such defined locations may be generated for example by interpolation, or by selection of the closest defined location, or the like.

In some examples, a geometrical compensation model may specify offset and/or scaling parameter(s) to be applied to a voxel model of an object, with parameters selected based on the location of the centre of the object. In such examples, the object model data may represent the object or object portion as a plurality of sub-volumes, wherein each sub-volume represents a region of the object which is individually addressable in object generation. In such examples, an offset may be applied by adding or eroding voxels from the object, and may be carried out strictly in the x, y and z directions. The resolution of such operations is tied to the resolution of the voxels. For example, a resolution of 600 dpi allows a uniquely addressable region of 42 by 42 microns in cross section, and thus voxels may be defined to relate to a 42 by 42 micron region. This means that adjustments may be made with a resolution at a minimum of 42 microns (or in some examples, 84 microns, as offsets may be applied symmetrically).

In another example, the parameters set(s) of a geometrical compensation model may be specified in the context of a compensation 'vector' to be applied to a mesh model. A scalar projection or Hadamard product (i.e. a component by component multiplication) of the geometrical compensation vector may be determined for example for each vertex of the model, such that each vertex may be shifted by reference to a vector determined based on the vertex's orientation relative to a coordinate system (for example, an xyz coordinate system) having a defined origin (which may for example be the object's centre). In other examples, the faces may be shifted.

For example, a compensation vector may be specified as an offset vector having the form $[O_x, O_y, O_z]$. Vertices of a mesh model of an object may be defined, which in turn define edges and faces. The faces are defined at different angles to the X, Y and Z axes, and the outwards facing normals to the faces may be determined by reference to the coordinates used to define the vertices, such that the normals to a particular face n may be defined as $[NF_{nx}, NF_{ny}, NF_{nz}]$. The defined normals may then be used to determine the offset to be applied to each face, for example using a Hadamard product, i.e. a component by component multiplication of the form $[NF_{nx}*O_x, NF_{ny}*O_y, NF_{nz}*O_z]$. In some examples, this may result in 'holes' appearing the model, which may in some cases be sealed with the definition of new faces or the like.

In other examples, the vertices and/or edges may be shifted in a similar way, with the normals thereto being determined in an appropriate manner.

Using such a process, each vertex, edge and/or triangle of the mesh may be offset in a manner which is determined in terms of its orientation in the model. This results in a modified virtual object where the modification may be applied independently of the size. By applying the offsets to the mesh models rather than voxel models, greater resolution may be achieved. Moreover, the model may be adjusted 'continuously' over an entire object surface as the offset applied evolves with the angle applied.

In the examples above, examples of geometrical compensation models in which the location of the object was indicated using a single representative coordinate, for example a centre of mass, or a centre of a bounding box enclosing the object were described. However, in particular for larger objects, because different portions of the object maybe in different zones of the fabrication chamber with different compensation parameters, this may result in a loss of information: the compensation parameters or values designed to compensate for the deformation associated with just one of these zones may be considered. Therefore, in at least some geometrical compensation models, values relating to a plurality of locations may be considered and combined. For example, the compensation values which are related to locations which are enclosed by the volume of the object may be combined. In other examples, additional values (for example, those associated with locations which are outside the object volume but within a threshold distance of the object's perimeter) may alternatively or additionally be included in the combination. In some examples, the combination may comprise determining an average value (which in some examples may comprise a weighted average, for example with values relating to locations which are outside the volume to be occupied by the object being give a lower weighting than those within the volume to be occupied by the object). In such examples, a combination of a plurality of parameter sets may be used to determine a parameter set to apply to an object.

In another example, different compensation parameters may be applied to different model portions. For example, a scaling factor to be associated with a vertex of an object model may be selected based on the location of that vertex. In those cases, the geometry of the part can be deformed more dramatically than scaling the whole part, for example parallelism between faces can be broken. For example, this can be implemented by applying scaling to each vertex from the object's centre (or any other fixed point).

In other examples, characteristics of the object, such as consideration of the object volume, may be used as input parameters in a geometrical compensation model. For example, bulkier objects may accrue greater thermal energy than smaller objects, and may therefore tend to accumulate more heat than smaller objects. Cooling such objects therefore takes more time than cooling less bulky objects, which may lead to different deformations. In addition, it may be that additional build material adheres to such objects due to the higher heat levels. Thus, in one example a first compensation model may comprise a compensation factor associated with object volume while in other examples there may be no such compensation factor, or a different compensation factor may be used. Other geometrical compensation models may for example include a consideration of how many objects are to be generated in a fabrication chamber and/or the proximity of the objects (for example in terms of 'packing density').

In other examples, other object generation parameter values (which may be object generation parameter values which are configurable or selectable by a user or operator) may be considered. The parameter(s) may be any parameter which may have an impact on dimensional inaccuracy. For example, the parameter(s) may comprise any, or any combination of, environmental conditions, object generation apparatus, object generation material composition (which may comprise selection of the type or composition of build material and/or print agents), object cooling profile or print mode. These may be specified, for example, by input to at least one processor. Thus different geometrical compensation models may relate to different apparatus, different print modes, different cooling profiles or the like.

The geometrical compensation models may for example be stored in a memory, for example embodied as mapping resources such as lookup tables and the like relating parameter(s) to a location, or through use of an algorithm or the like.

Block 106 comprises simulating, using at least one processor, and at least in part, an object generation operation based on a modification of the object model data using the or each selected geometrical compensation model.

In some examples, this may comprise generating at least one simulated object having characteristics which are predicted for object(s) generated based on a modification according to a particular geometrical compensation model. In other examples, this may comprise simulating object attributes, such as at least one object dimension (i.e., generation of the whole object may not be simulated in all examples). A simulation may for example be determined using a model of object deformation on object generation, using object model data modified by a particular geometrical transformation model. Such an object deformation model may be determined in a similar manner as described for geometrical compensation models (and in some examples, may be generated alongside such geometrical compensation models). For example, an object deformation model may be generated by generating a plurality of test objects and observing the deformation thereof, and inferring object deformation behaviour therefrom. In some example, the effect of parameters such as any or any combination of object location, object volume, object surface area and the like may be included in an object deformation model. The simulations maybe generated using machine learning techniques. In some examples, object deformation models may be generated based on an analysis of thermal and/or material considerations and the like.

In some examples, the same object deformation model is used for object model data modified using each of a plurality of geometrical compensation models.

Figure 2A:
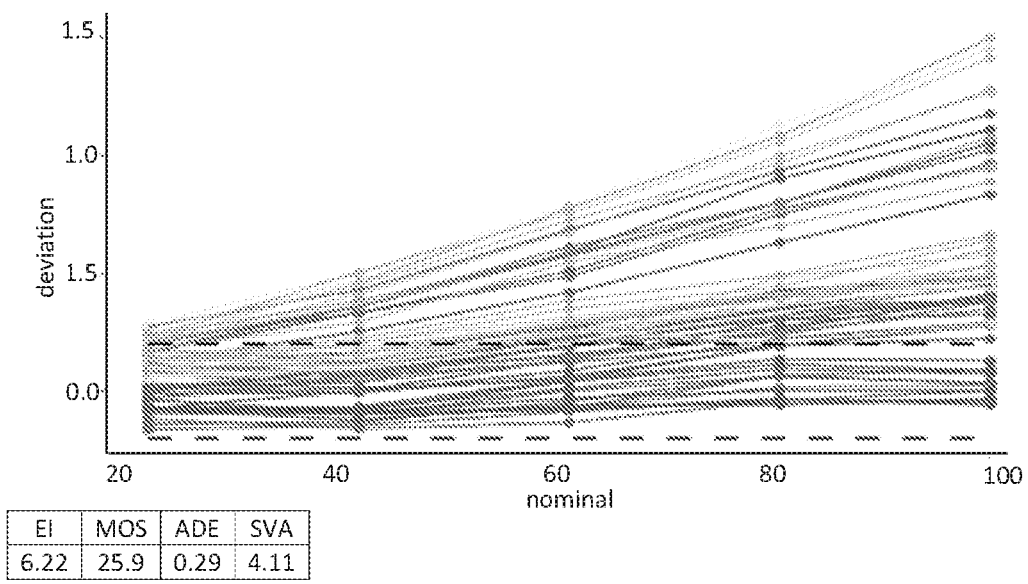
FIGS. 2A and 2B show examples of displays of additive manufacturing data.
Figure 2B:
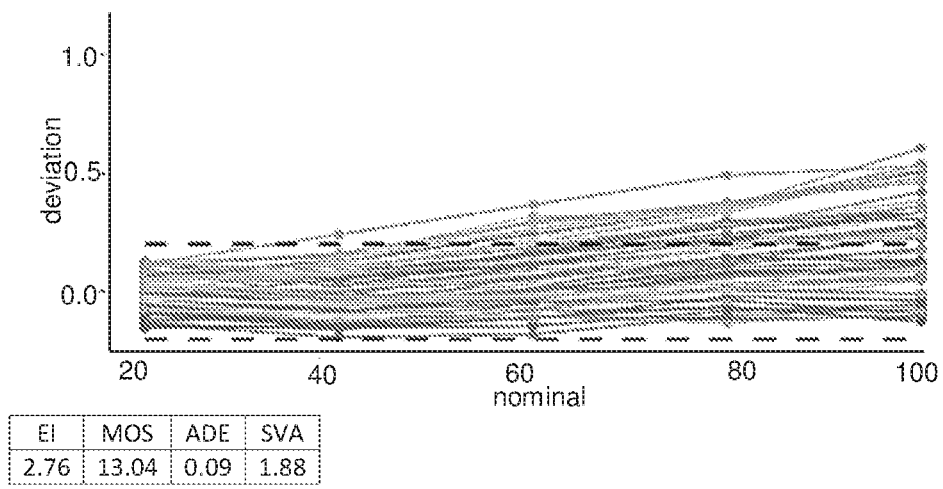

Block 108 comprises displaying, using at least one processor, predicted attributes of the object(s) when generated based on the or each simulation. In some examples, this may comprise displaying image(s) of an object. In other examples, characteristics such as dimensions may be displayed. These may be displayed in chart or graph form such that information may be quickly compared by a user. The predicted attributes may for example comprise expected object dimensions in each of three orthogonal axes. In another example, the predicted attributes may comprise an indication of a proportional deviation of at least one object dimension based on the magnitude of the dimension, as is shown in FIGS. 2A and 2B.

Different geometrical compensation models may be optimised or tailored for different intended outcomes. Therefore, geometrical compensation models may produce different compensations, which may for example be more effective in one region of an object than in another and/or which may result in unintended effects (artefacts) in a given object, but not in another. For example, some geometrical transformations may close up gaps or holes in a particular object which are intended to remain open, or may result in holes appearing.

It may be the case that, for a given use case, some object dimensions or characteristics (or indeed some objects in the case where generation of a plurality of objects is modelled) are considered to be of a higher priority than others. By simulating such object dimensions/characteristics, verification that an object modified using a particular compensation model is likely to be as intended in relation to those particular dimension(s)/object(s) may be made, whereas there may be a greater degree of tolerance in relation to other dimension(s)/object(s).

In some examples, a compensation model may be generated based on a number of test objects being generated. In some examples, the test objects may comprise multiple instances of the same, or just a few, underlying object data models. While such a compensation model may perform well for the test objects, another object may for example be modified in a manner which introduces distortions to the object. In such a case, applying a compensation may decrease the accuracy of an object.

By simulating the effect of different compensation models, occurrences in which generated objects are not within intended parameters may be detected and minimised. This may for example allow the most suitable compensation model for a particular object and/or use case to be identified.

By displaying such predicted attributes (for example graphically), an appropriate compensation for a given use case may be selected. This may in turn prevent physical experimentation (e.g. the printing or generation of one or a plurality of test objects), saving time, materials and energy.

In some examples, the selection of a geometrical compensation model to be used in object generation may be made automatically against predetermined criteria. In other example the selection may be made by a user evaluating the characteristics. A user may be readily able to identify attributes for a given use case.

FIG. 2A represents measurements of a plurality of instances of the same object which were printed in a single fabrication chamber in a single print operation, each object occupying a different position in the fabrication chamber. Each line links data points associated with a particular object, the data specifying deviations in millimetres of predetermined object dimensions with respect to an intended value at different points at a nominal distance along an object in a nominal direction.

Such measurements may be displayed in a user interface. In some examples of a user interface, one of the lines may be selected in isolation from the other lines. In some examples of a user interface, each dimension may be inspected separately.

In FIG. 2A, the displayed data is the data for the Z axis.

FIG. 2A also shows a number of metrics comprising:

EI (Error Index): The square root of the mean of the squared errors normalised to the nominal multiplied by a factor of 1000.

MOS (Metric Of Spreading): Average over the nominals of the standard deviations of the deviation; multiplied by a fixed normalization factor.

ADE (Average Deviation): The average of all deviations.

SVA (Slope Variability): The standard deviation over the parts of the slope of a linear regression of the deviation as a function of the nominal multiplied by a fixed normalization factor.

FIG. 2B shows simulated data for the same set of objects assuming that a particular geometrical transformation model has been applied. Both the dimensional deviations and the same metrics have been simulated and predicted. These metrics are used purely as examples, and different metrics, or different combinations of metrics, may be used in other examples.

It may be noted that it is generally predicted that the objects will be closer to an intended size than the measured printed objects shown in FIG. 2A, but that some objects are predicted to be associated with larger deviations than others. In the particular example used to generate the data shown in FIG. 2B, a model has been applied which uses the position of each object as an input parameter.

There may be selectable input parameters. For example, the location of the object may be modelled as a point location in one instance and modelled in a manner which extends over the volume in another instance.

A Graphic User Interface, which may appear similar to FIG. 2B may be displayed to a user. In some examples, the user may be able to select between geometrical compensation models through use of a selectable option (for example a drop down menu, selectable list or any other user interface). Predicted attributes of object(s) following modification of the object model data according to the selected geometrical compensation model(s) may be displayed. In some examples, a selection may be confirmed for object generation following displayer thereof. In other words, one of the geometrical compensation models used to generate the simulation may be selected (by a user via a user interface, or automatically) may be selected for object generation, as is now described in relation to FIG. 3.

Figure 3:
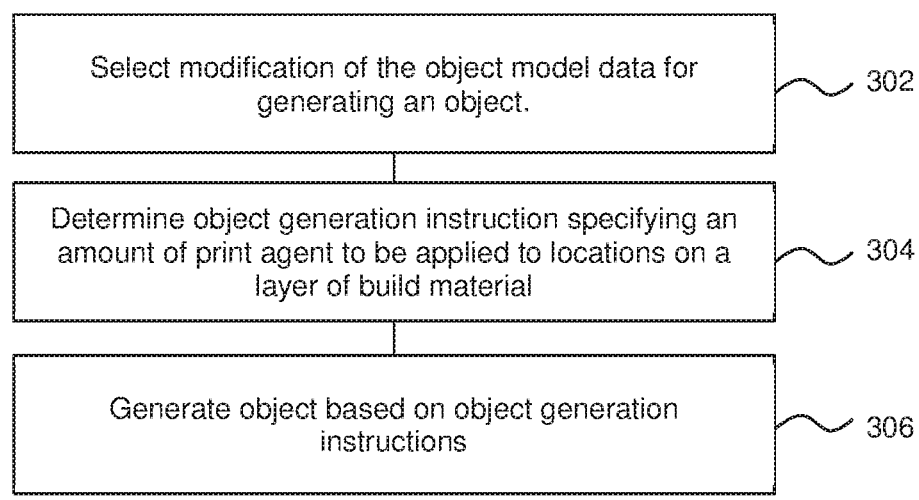
FIG. 3 shows an example method of object generation.

FIG. 3 is an example method of object generation, comprising, in block 302, selecting a modification of the object model data for generating an object. This may for example be selected by user input (for example, a user may indicate the model to be used to determine the modification), or automatically, for example by evaluating the predicted attributes against predetermined data. The modification may be selected based on the output of the method of FIG. 1, for example after a user has viewed simulations of the expected dimensions and/or a set of such simulations has been reviewed by a processor for its conformity with predetermined criteria. Selecting the modification may comprise selecting a geometrical transformation model to use to determine a geometrical transformation and applying, using the selected model, the geometrical transformation to generate modified object data. A user may select the modification/geometrical transformation model using a graphic user interface, for example through use of a drop down menu or the like.

Block 304 comprises determining object generation instructions (or 'print instructions') for generating the object. The object generation instructions in some examples may specify an amount of print agent to be applied to each of a plurality of locations on a layer of build material. For example, generating object generation instructions may comprise determining 'slices' of a virtual build volume comprising virtual object(s) to which a modification has been applied, and rasterising these slices into pixels (or voxels, i.e. three-dimensional pixels). An amount of print agent (or no print agent) may be associated with each of the pixels/voxels. For example, if a pixel relates to a region of a build volume which is intended to solidify, the object generation instructions may be generated to specify that fusing agent should be applied to a corresponding region of build material in object generation. If however a pixel relates to a region of the build volume which is intended to remain unsolidified, then object generation instructions may be generated to specify that no agent, or a coalescence modifying agent such as a detailing agent, may be applied thereto. In addition, the amounts of such agents may be specified in the generated instructions and these amounts may be determined based on, for example, thermal considerations and the like.

Block 306 comprises generating an object based on the object generation instructions. For example, such an object may be generated layer by layer. For example, this may comprise forming a layer of build material, applying print agents, for example through use of 'inkjet' liquid distribution technologies in locations specified in the object generation instructions for an object model slice corresponding to that layer using at least one print agent applicator, and applying energy, for example heat, to the layer. Some techniques allow for accurate placement of print agent on a build material, for example by using print heads operated according to inkjet principles of two dimensional printing to apply print agents, which in some examples may be controlled to apply print agents with a resolution of around 600 dpi, or 1200 dpi. A further layer of build material may then be formed and the process repeated, for example with the object generation instructions for the next slice.

In this way, the object once formed may end up being closer to an intended size. Moreover, as a suitable model is more likely to be selected than if a model is selected without simulation, it is more likely that the object will conform to expected parameters and to meet user and/or technical specifications. As such, generation of unsuitable objects, and the resulting waste in materials, time and energy, may be reduced or prevented.

In some examples, the methods set out herein may be combined with other methods of object model modification. For example, a modification function may be employed in the vicinity, or locality, of small features. An erosion of such small features may result in an unacceptable reduction in their size, either obliterating the feature or rendering it too small to fuse or too delicate to survive cleaning operations. For example, if a feature has a dimension of around 0.5 mm, this may correspond to 12 voxels at 600 dpi. If three or four voxels are eroded from the side of such a small feature, it will lose approximately 50 to 60% of its cross-section, reducing its size to less than 0.3 mm. Such a feature may be too small to survive cleaning operations. Thus, in some examples, other functions may be used to ensure that small features are preserved.

Figure 4:
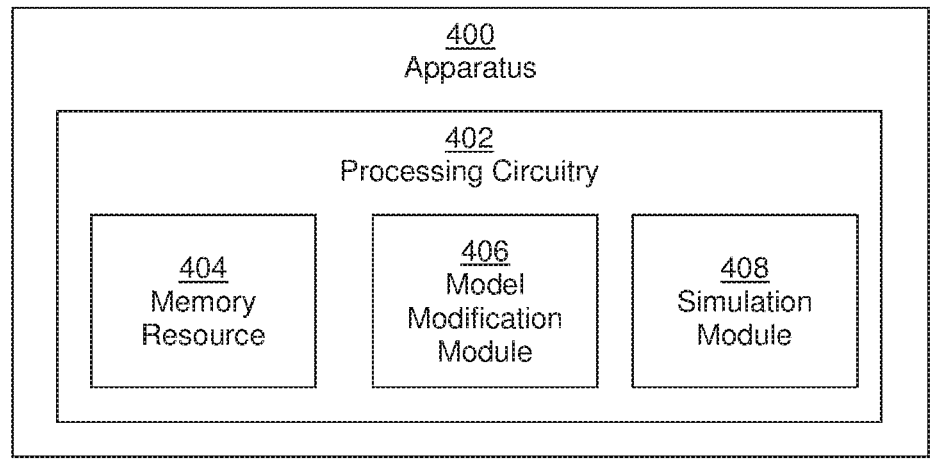
FIGS. 4 and 5 are simplified schematic drawings of example apparatus for additive manufacturing.

FIG. 4 shows an apparatus 400 comprising processing circuitry 402. The processing circuitry 402 comprises a memory resource 404, a model modification module 406 and a simulation module 408.

The memory resource 404, at least in use of the apparatus 400, stores a plurality of geometrical compensation models to determine geometrical compensations to compensate for object deformation in additive manufacturing. For example, this may comprise any or any combinations of mapping resources, transformation vector(s), compensation parameter(s), algorithm(s) or the like, as have been described above. The geometrical compensation models may be intended to compensate for object deformation in additive manufacturing, wherein each geometrical compensation model may specify or determine a compensation to apply based on predetermined criteria, which may differ between models. In some examples, as has been discussed above, the models may relate the compensation to be applied to any of object placement locations within a fabrication chamber, object volume, object surface area, or the like. The geometrical compensation models may have any of the features of the geometrical compensation models discussed above. The memory resource 404 may also store an object deformation model as described above.

The model modification module 406, in use of the apparatus 400, determines a geometric transformation for an object to be generated using additive manufacturing based on a selected geometrical compensation model and modifies the object model data using the geometrical transformation.

The simulation module 408, in use of the apparatus 400, generates a simulation of an output of an additive manufacturing operation based on modified object model data. The simulated output may comprises a simulated object, or any attribute thereof. For example, the simulation module 408 may carry out the processes described in relation to FIG. 1 above, and may generate a simulation of at least one predicted object attribute (e.g. dimension or the like), for example based on an object deformation model.

Figure 5:
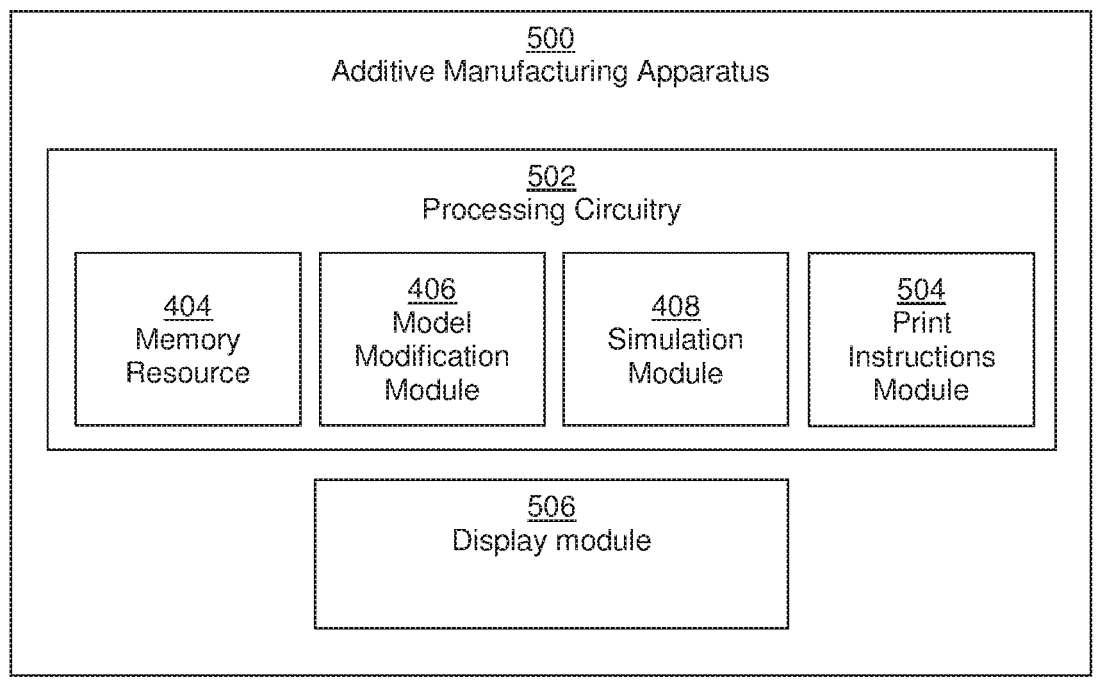

FIG. 5 shows an additive manufacturing apparatus 500 to generate an object. The additive manufacturing apparatus 500 comprises processing circuitry 502. The processing circuitry 502 comprises the memory resource 404, the model modification module 406 and the simulation module 408 of FIG. 4 and further comprises a print instructions module 504 and a display module 506.

The print instructions module 504, in use of the apparatus 500, determines print instructions for generating the object from modified object model(s) generated by the data model modification module 406.

The display module 506 may comprise a screen or the like to display predicted attributes of an object based on the simulated additive manufacturing operation.

The additive manufacturing apparatus 500, in use thereof, generates the object in a plurality of layers (which may correspond to respective slices of an object model) according to the print instructions. The additive manufacturing apparatus 500 may for example generate an object in a layer-wise manner by selectively solidifying portions of layers of build materials. The selective solidification may in some examples be achieved by selectively applying print agents, for example through use of 'inkjet' liquid distribution technologies, and applying energy, for example heat, to the layer. The additive manufacturing apparatus 500 may comprise additional components not shown herein, for example any or any combination of a fabrication chamber, a print bed, printhead(s) for distributing print agents, a build material distribution system for providing layers of build material, energy sources such as heat lamps and the like.

The print instructions generated by the print instructions module 504 (or object generation instructions) may, in use thereof, control the additive manufacturing apparatus 500 to generate each of the plurality of layers of the object. This may for example comprise specifying area coverage(s) for print agents such as fusing agents, colorants, detailing agents and the like. In some examples, object generation parameters are associated with object model sub-volumes. In some examples, other parameters, such as any, or any combination of heating temperatures, build material choices, an intent of the print mode, and the like, may be specified. In some examples, halftoning may be applied to determined object generation parameters to determine where to place fusing agent or the like. The control data may be specified in association with sub-volumes (e.g. voxels as described above). In some examples, the control data comprises a print agent amount associated with sub-volumes.

The processing circuitry 402, 502 or the modules thereof may carry out any of the blocks of FIG. 1, or any of block 302 to 304 of FIG. 3.

Figure 6:
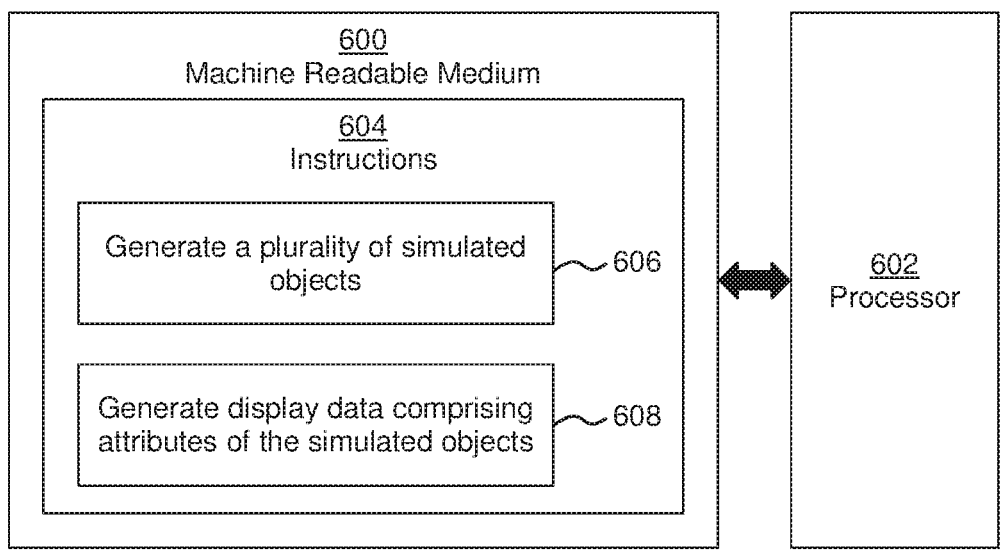
FIG. 6 is a simplified schematic drawing of an example machine-readable medium associated with a processor.

FIG. 6 shows a tangible machine-readable medium 600 associated with a processor 602. The machine-readable medium 600 comprises instructions 604 which, when executed by the processor 602, cause the processor 602 to carry out tasks. In this example, the instructions 604 comprise instructions 606 to cause the processor 602 to generate a plurality of object simulations, each of the object simulations being based on an application of a different deformation compensation model to object model data representing at least a portion of an object to be generated by an additive manufacturing apparatus by fusing build material within a fabrication chamber and instructions 608 to cause the processor 602 to generate display data comprising attributes of the simulated objects. For example, data similar to that discussed in relation to FIG. 2B may be displayed. In some examples, the instructions 604 comprise instructions which when executed cause the processor 602 to accept a selection of a deformation compensation model; and determine print instructions for generating the object.

The deformation compensation models may have any of the features of the geometrical compensation models discussed above.

In some examples, the instructions when executed cause the processor 602 to carry out any of the blocks of FIG. 1 or any of block 302 to 304 of FIG. 3. In some examples, the instructions may cause the processor 602 to act as any part of the processing circuitry 402, 502 of FIG. 4 or FIG. 5.

Examples in the present disclosure can be provided as methods, systems or machine-readable instructions, such as any combination of software, hardware, firmware or the like. Such machine-readable instructions may be included on a computer readable storage medium (including but not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each block in the flow charts and/or block diagrams, as well as combinations of the blocks in the flow charts and/or block diagrams can be realized by machine-readable instructions.

The machine-readable instructions may, for example, be executed by a general purpose computer, a special purpose computer, an embedded processor or processors of other programmable data processing devices to realize the functions described in the description and diagrams. In particular, a processor or processing apparatus may execute the machine-readable instructions. Thus functional modules of the apparatus (such as the model modification module 406, simulation module 408 or the print instructions module 504) may be implemented by a processor executing machine-readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine-readable instructions may also be stored in a computer readable storage that can guide the computer or other programmable data processing devices to operate in a specific mode.

Machine-readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flowcharts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method comprising:
   receiving, by a processor, object model data representing an object to be generated by an additive manufacturing apparatus by depositing and fusing build material within a fabrication chamber on a layer-by-layer basis;
   simulating, by the processor, an object generation operation for each of a plurality of different geometrical compensation models that each specifies geometrical compensations to be applied to the object model data to compensate for deformation of the object during cooling of the object after additive manufacture of the object;
   selecting one of the different geometrical compensation models based on the object generation operation that has been simulated;
   modifying, by the processor, the object model data using the different geometrical compensation model that has been selected; and
   causing, by the processor, the additive manufacturing apparatus to generate the object using the object model data as has been modified.

2. The method according to claim 1, further comprising:
   for each of the different geometrical compensation models, displaying, by the processor, predictive attributes of the object based on the object generation operation that has been simulated.

3. The method according to claim 2, wherein the predicted attributes comprise expected object dimensions of the object.

4. The method according to claim 2, wherein the predicted attributes comprise an indication of a proportional deviation of an object dimension of the object based on a magnitude of the object dimension.

5. The method according to claim 2, wherein the object is a first object represented by the object model data, the object generation operation is a first object generation operation, and the predictive attributes are first predictive attributes,
   wherein the object model data further represents one or more second objects to be generated by the additive manufacturing apparatus by depositing and fusing the build material within the fabrication chamber on the layer-by-layer basis,
   wherein the object model data includes a printable arrangement of the first object and the one or more second objects within the fabrication chamber,
   and wherein the method further comprises:
   for each of the one or more second objects, simulating, by the processor, a second object generation operation for each of the different geometrical compensation models; and
   for each of the different geometrical compensation models, displaying, by the processor, second predicted attributes of each of the one or more second objects based on the second object generation operation that has been simulated.

6. The method according to claim 1, wherein the different geometrical compensation models comprise different offset parameters and different scaling parameters.

7. The method according to claim 1, wherein each of the different geometrical compensation models relate to an intended location of the object to be generated within the fabrication chamber.

8. A system comprising:
a processor; and
a memory storing:
  object model data representing an object to be generated by an additive manufacturing apparatus by depositing and fusing build material within a fabrication chamber on a layer-by-layer basis;
  a plurality of different geometrical compensation models that each specifies geometrical compensations to be applied to the object model data to compensate for object deformation during cooling of the object after additive manufacture of the object; and
  program code; and
wherein the program code is executable by the processor to:
  simulate an object generation operation for each of the different geometrical compensation models;
  select one of the different geometrical compensation models based on the object generation operation that has been simulated;
  modify the object model data using the different geometrical compensation model that has been selected; and
  cause the additive manufacturing apparatus to generate the object using the object model data as has been modified.

9. The system according to claim 8, wherein the program code is executable by the processor to further:
  for each of the different geometrical compensation models, display predicted attributes of the object based on the object generation operation that has been simulated.

10. The system according to claim 8, wherein the program code is executable by the processor to further:
  determine print instructions for generating the object from the object model data as has been modified.

11. The system according to claim 10, wherein the additive manufacturing apparatus is caused to generate the object using the object model data as has been modified by using the print instructions.

12. A non-transitory machine-readable medium comprising storing instructions executable by a processor to perform processing comprising:
  receiving object model data representing an object to be generated by an additive manufacturing apparatus by depositing and fusing build material within a fabrication chamber on a layer-by-layer basis;
  simulating an object generation operation for each of a plurality of different geometrical compensation models that each specifies geometrical compensations to be applied to the object model data to compensate for deformation of the object during cooling of the object after additive manufacture of the object;
  selecting one of the different geometrical compensation models based on the object generation operation that has been simulated; and
  modifying the object model data using the different geometrical compensation model that has been selected;
  causing the additive manufacturing apparatus to generate the object using the object model data as has been modified.

13. The non-transitory machine-readable medium of claim 12, wherein selecting the one of the different geometrical compensations comprises:
  accepting selection of the one of the different geometrical compensations.

* * * * *